US007641435B1

(12) United States Patent
Kelly

(10) Patent No.: US 7,641,435 B1
(45) Date of Patent: Jan. 5, 2010

(54) METHOD AND APPARATUS FOR PLACING A TARPAULIN OVER A LOAD

(76) Inventor: Douglas Kelly, 3220 Crescent Ave., #1, Eugene, OR (US) 97408

( * ) Notice: Subject to any disclaimer, the term of this patent is extended or adjusted under 35 U.S.C. 154(b) by 481 days.

(21) Appl. No.: 11/725,115

(22) Filed: Mar. 15, 2007

(51) Int. Cl.
*B65H 1/00* (2006.01)
(52) U.S. Cl. ......................................... 414/607; 410/98
(58) Field of Classification Search ............... 410/98, 410/97, 100; 414/607, 403, 278; 242/919; 296/100.01; 405/129.75; 248/499
See application file for complete search history.

(56) References Cited

U.S. PATENT DOCUMENTS

| 5,304,014 | A | 4/1994 | Slutz | |
|---|---|---|---|---|
| 6,634,850 | B2 | 10/2003 | Christensen | |
| 7,189,042 | B1 * | 3/2007 | Schmit | 410/100 |

OTHER PUBLICATIONS

Road Freight Transport Industry Solutions, "Putting a tarpaulin over a Truck or Semi-Trailer" (date unknown).

* cited by examiner

*Primary Examiner*—Stephen Gordon
(74) *Attorney, Agent, or Firm*—Robert E. Howard

(57) ABSTRACT

A method and apparatus for placing a protective sheet over a load. The apparatus includes a chassis having outer and inner wheels adapted to allow the chassis to traverse along a horizontal path of motion. A mandrel support beam is attached to the chassis adjacent its inner end, the outer end extending beyond the chassis with its longitudinal axis being substantially perpendicular to the horizontal path of motion of the chassis. A mandrel is rotatably attached to the chassis, the outer end of the mandrel being rotatably supported by the mandrel support beam. At least one of the inner wheels of the chassis is in contact with the mandrel adjacent its inner end in a manner adapted to cause the mandrel to rotate upon rotation of the wheel. Pockets located along the mandrel allow the sheet to be releasably attached for winding up onto the mandrel.

12 Claims, 4 Drawing Sheets

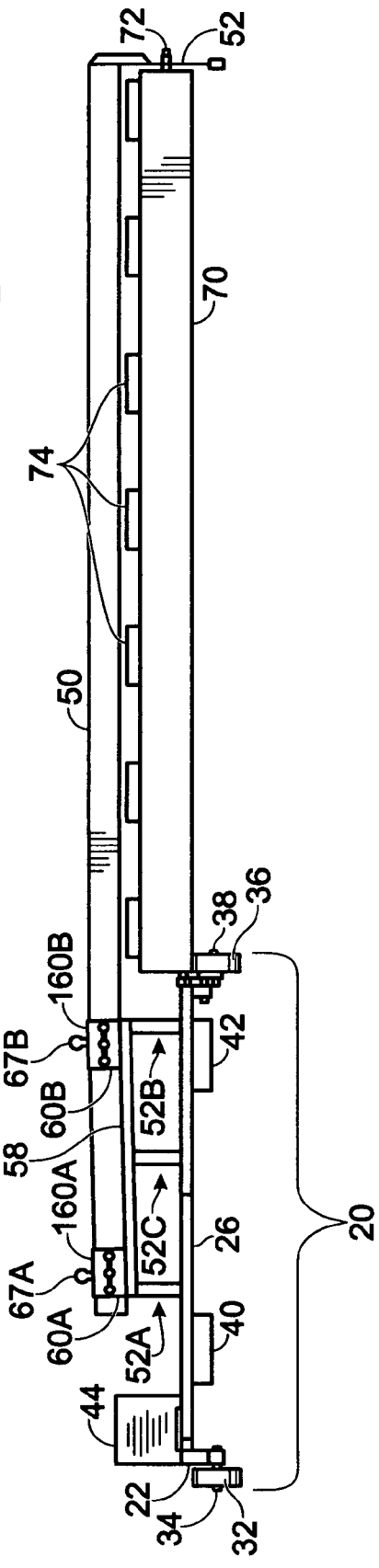

— 1 —

METHOD AND APPARATUS FOR PLACING A TARPAULIN OVER A LOAD

BACKGROUND OF THE INVENTION

The present invention relates to a method and apparatus for placing a tarpaulin over a load, such as one carried by a truck, semi-trailer or other land or water load transportation vehicle, or a load stacked on a floor or the ground.

Operators of trucks or semi-trailers often protect a load being transported by covering the load with a tarpaulin. Installing the tarpaulin usually involves having a person climb to the top of the load and drag the tarpaulin over the load. Such a procedure is dangerous since the installer may fall to the ground, resulting in serious injury or death.

It has been suggested to use a device called a Barney's Beam. This device is a horizontal beam attached to a frame. One end of the tarpaulin is attached to the beam and frame on the ground, the beam and frame lifted with a forklift to a height above the load, the beam and frame advanced along the side of the truck to pull the tarpaulin over the load, and the tarpaulin tied down from the ground. Such a procedure can cause damage to the tarpaulin and/or load.

U.S. Pat. No. 6,634,850 describes a truck/trailer tarping device. This device can be mounted on the forks of a forklift and includes a tray portion and a plurality of wheels that can be rotated clockwise or counterclockwise by means of drive system. A tarp is placed between the wheels and the tray portion, and rotated in a direction to pull the tarp onto the tray, as best seen in FIGS. 11A-11C. The device is then moved by the forklift to a position over the load to be covered (as seen in FIG. 11D), and the wheels rotated in a direction to unroll the tarp over the load. This device is complicated.

SUMMARY OF THE INVENTION

The present invention is a device for placing a protective sheet material, such as a tarpaulin, over a load without requiring a worker to climb on top of the load, and which is easy to use. The load to be covered can be one carried by a flat-bed truck, semi-trailer, or other land or water transportation vehicle, or it can be a load stacked on a floor or the ground.

The device has a chassis to which a horizontal mandrel is rotatably attached. A mandrel support beam is attached to the chassis above the mandrel, and the outer end thereof has a downwardly extending leg to which the outer end of the mandrel is rotatably attached.

The chassis has two outer wheels and two inner wheels. The inner wheels rotatably engage the inner end of the mandrel.

The chassis has forklift receiving tubes to allow the forks of a forklift to be inserted to move and raise the device.

In use a tarpaulin is laid out on the ground and has its side portions double folded back onto the main body portion. The forklift driver maneuvers the mandrel over the tarpaulin end opposite the tarpaulin end flap, and that end is removably attached to the mandrel by means of aligned "pockets" located along the length of the mandrel.

The forklift is then moved towards the unattached end (the end containing the end flap) which causes the inner and outer wheels of the device to rotate. Rotation of the inner wheels causes the mandrel to rotate and wind up the tarpaulin onto the mandrel. Winding is stopped when the juncture of the end flap to the main body portion of the tarpaulin is reached. No motor is required to rotate the mandrel.

The wound up tarpaulin is then moved to the loaded truck/trailer, raised to a height above the height of the load on the truck/trailer, and the end flap portion attached to the load or truck/trailer. The forklift then moves along the load, unwinding the tarpaulin as it moves forward. The end of the tarpaulin releases itself from the mandrel, and the sides of the tarpaulin are then attached to the bed of the truck/trailer in the usual manner.

BRIEF DESCRIPTION OF THE DRAWINGS

FIG. 1 is a front elevation view of the tarpaulin placement device of the present invention;

FIG. 2 is a top plan view of the device;

DESCRIPTION OF PREFERRED EMBODIMENTS

The tarpaulin placement device 10 includes a chassis 20, a cylindrical mandrel support beam 50, and a cylindrical rotatable mandrel 70.

Figure 3:
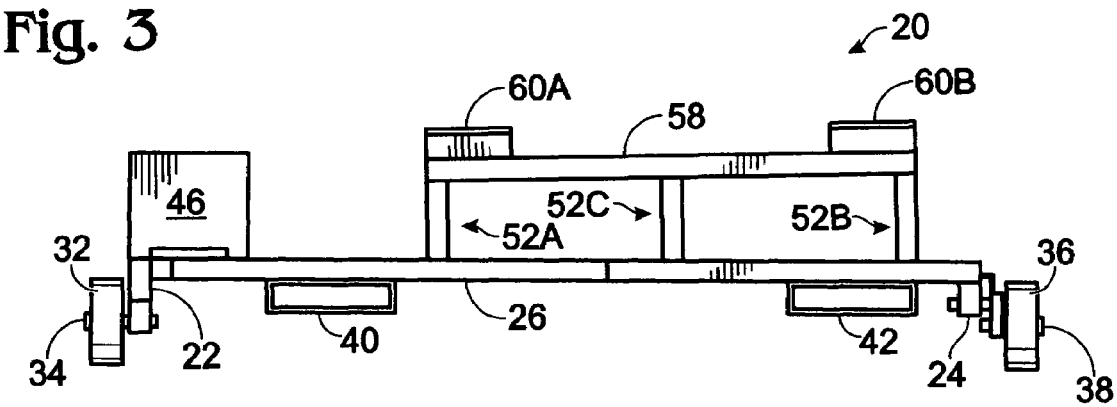
FIG. 3 is a front elevation view of the chassis of the device.
Figure 4:
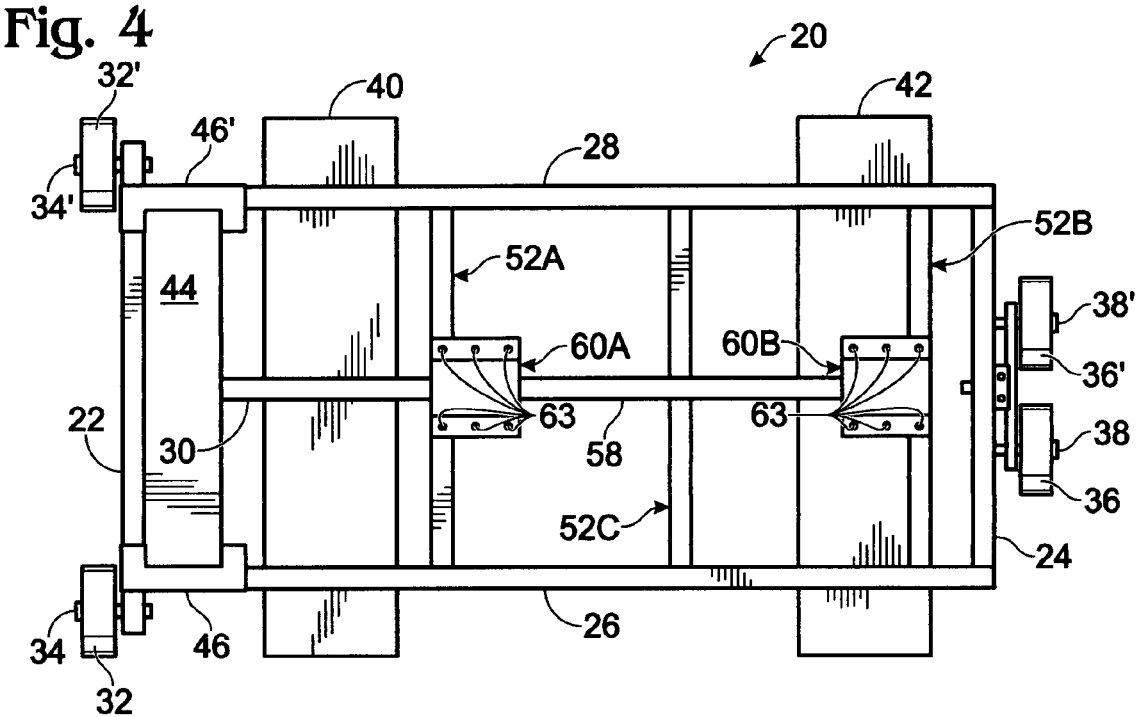
FIG. 4 is a top plan view of the chassis of the device.

As best seen in FIGS. 3 and 4, chassis 20 includes right and left end frame members 22 and 24, front and rear cross frame members 26 and 28, and central cross frame member 30.

Right front and right rear wheels 32 and 32' are rotatably attached to right end frame member 22 by axles 34 and 34'. Left front and left rear wheels 36 and 36' are rotatably attached to left end frame member 24 by axles 38 and 38'. Right front and right rear wheels 32 and 32' are located adjacent the front and rear ends, respectively, of right end frame member 22. Left front and left rear wheels 36 and 36' are located in a front and rear mid-portion of left end frame member 24, and are spaced apart a distance adapted to allow mandrel 70 to abut the upper portions of wheels 36, 36', and to cause mandrel 70' to be rotated by rotation of the wheels 36, 36'.

Wheels 32, 32', 36, and 36' allow chassis 20 to be moved along a horizontal path of motion.

Although two right wheels 32, 32' and two left wheels 36, 36' are shown, one or more additional wheels can be located on the right and/or left sides of chassis 20.

Right and left fork lift tubes 40 and 42 are attached to the undersides of front and rear cross frame members 26 and 28, and central cross frame member 30, such as by welding. Right and left fork lift tubes 40 and 42 are generally rectangular in cross-section, and adapted to receive the forks of a fork lift from either the front or rear.

Figure 5:
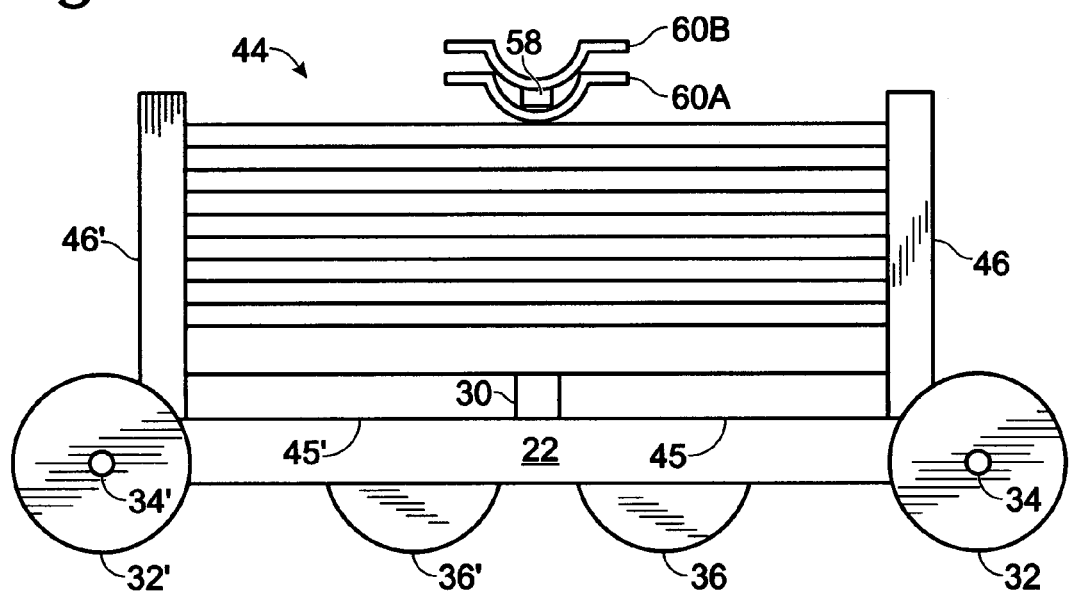
FIG. 5 is a right side elevation view of the chassis of the device

A counterbalancing weight mass 44 is positioned onto floor portions 45, 45' on the right side of chassis 20, and secured thereto by any suitable means, such as front and rear end dams 46, 46'. Counterbalancing weight mass 44 can be a single block of material or built up of slabs of material (as shown in FIG. 5). The weight of counterbalancing weight mass 44 is selected to prevent device 10 from tipping over due to the leveraged weight of those portions of mandrel support beam 50 and mandrel 70 that extend beyond chassis 20 and the weight of the tarpaulin 80 wound up onto the mandrel 70.

Mandrel support beam 50 is supported on chassis 20 by right and left stanchions 52A and 52B, central stanchion 52C, cross-beam 58 and flanged clamp members 60A and 60B. Although it is preferred that mandrel support beam 50 have a cylindrical cross-section, other beam shapes could be used. Whatever its shape, mandrel support beam 50 is preferably hollow to minimize its weight.

Figure 6:
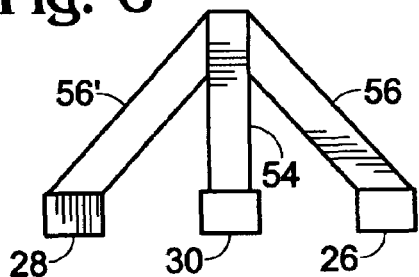
FIG. 6 is a right side elevation view of one of the mandrel holder beam stanchions.
Figure 7:
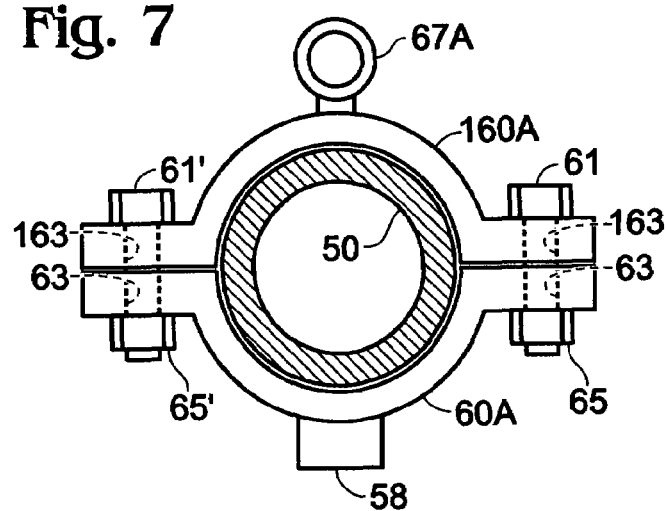
FIG. 7 is a right side elevation view of the mandrel holder beam held by a U-shaped clamping member.

Right stanchion 52A is shown in FIG. 6, and includes vertical column 54, and front and rear angled struts 56 and 56'. The bottom ends of vertical column 54 and front and rear angled struts 56 and 56' are attached to the upper surfaces of cross frame members 26, 28 and 30 of chassis 20, such as by welding. Left stanchion 52B and central stanchion 52C are substantially identical to right stanchion 52A. However, central stanchion 52C is preferably taller than right stanchion 52A, and left stanchion 52B is preferably taller than central stanchion 52C, as shown in FIG. 3, to impart an appropriate camber to mandrel support beam 50.

A cross-beam 58 extends across the tops of stanchions 52A, 52B, and 52C, and is attached to the top of the vertical columns 54 thereof, such as by welding.

U-shaped flanged clamp member 60A is attached to the upper surface of cross-beam 58 adjacent right stanchion 52A, such as by welding. Similarly, U-shaped flanged clamp member 60B is attached to the upper surface of cross-beam 58 adjacent left stanchion 52B, such as by welding. Bolt holes 63 pass through the flange portions of clamp members 60A and 60B, and bolt holes 163 pass through the flange portions of mating inverse clamp members 160A and 160B.

The inner (right) end portion of cylindrical mandrel support beam 50 is placed into the cradles formed by U-shaped flanged clamping members 60A and 60B. Mating right and left inverse U-shaped flanged clamping members 160A and 160B are placed over cylindrical mandrel support beam 50 and into contact with flanged clamping members 60A and 60B, respectively. The bolt holes 63 located in the flanges of flanged clamp member 60A and the bolt holes 163 located in the flanges of flanged clamp member 160A are positioned into alignment. Similarly, the bolt holes 63 located in the flanges of flanged clamp member 60B and the bolt holes 163 located in the flanges of flanged clamp member 160B are positioned into alignment. Front and rear bolts 61 and 61' are passed through the holes 63, 163 of inverse flanged clamp member 160A and holes 63, 163 of flanged clamp member 60A, and secured with front and rear nuts 65 and 65'. Similarly, front and rear bolts 61 and 61' are passed through the holes 63, 163 of inverse flanged clamp member 160B and holes 63, 163 of flanged clamp member 60B, and secured with front and rear nuts 65 and 65'. The outer end of cylindrical mandrel support beam 50 extends beyond chassis 20 substantially the same distance as the outer end of mandrel 70.

A leg 52 extends vertically downward from the outer (left) end of support beam 50, and has an opening therein (which can be journalled) to receive a stub axle 72 extending outwardly from the outer (left) end of mandrel 70. The inner (right) end of mandrel 70 rests against the upper portions of both of left, inner wheels 36 and 36' of chassis 20.

Figure 9:
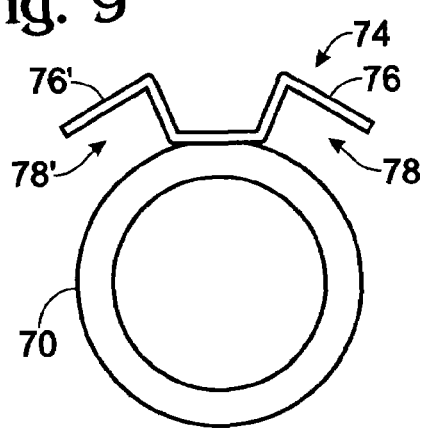
FIG. 9 is a right side elevation view of the mandrel and an attached pocket taken along line 9-9 of FIG. 8.
Figure 8:
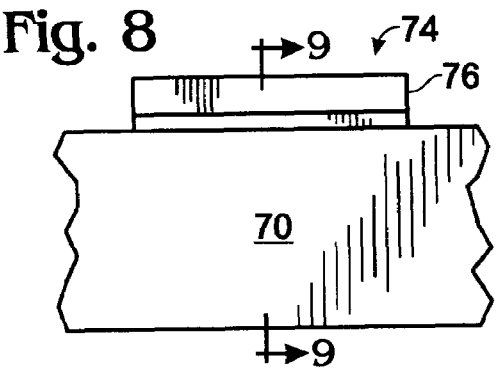
FIG. 8 is a partial front elevation view of the mandrel and an attached pocket.

A plurality of aligned pocket members 74 are positioned along the length of mandrel 70 and attached thereto. As best seen in FIGS. 8 and 9, each pocket member 74 includes front and rear angled arms 76, 76' which form recesses 78, 78' for receiving and holding end 85 of tarpaulin 80.

Figure 10:
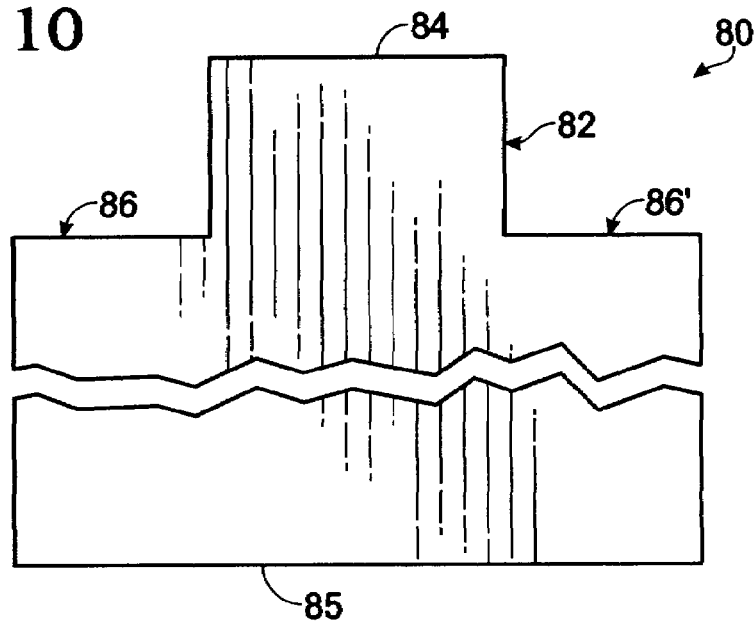
FIG. 10 is a top plan view of an unrolled tarpaulin.
Figure 11:
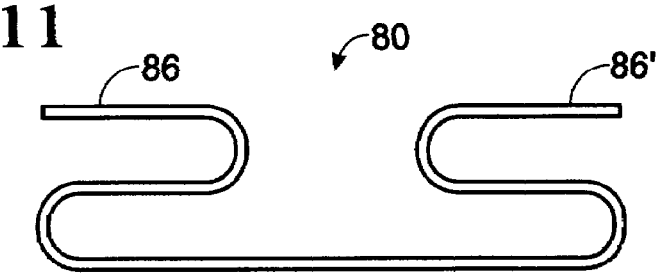
FIG. 11 is a front elevation view of an unrolled tarpaulin with its side flaps double folded inwardly.

In use, a tarpaulin 80 having an end flap 82 with a trailing edge 84, leading edge 85, and right and left side flaps 86 and 86' is spread out on the ground, as shown in FIG. 10. The right and left side flaps 86 and 86' are double folded inwardly in an overlapping S-shape manner so that the width of the main body of the tarpaulin 80 becomes substantially the same as the width of the end flap 82, as best seen in FIG. 11. Tarpaulin 80 may be formed of any flexible sheet material suitable for covering and protecting a product.

The forks of a forklift (not shown) are inserted into forklift tubes 40 and 42. Safety chains (not shown) are attached to eyebolts 67A and 67B, and to the forklift.

The forks of the forklift can be inserted into either end of the forklift tubes 40, 42. When the forklift is to move forward to wind up tarpaulin 80, the left fork would be inserted into the right forklift tube 40 and the right fork would be inserted into the left forklift tube 42. If the forklift is to move in reverse to wind up tarpaulin 80, the right fork would be inserted into the right forklift tube 40 and the left fork would be inserted into the left forklift tube 42. The choice of whether to move the forklift in forward or in reverse during winding up of tarpaulin 80 depends on which side of the truck or trailer it is desired to locate the forklift during unwinding and positioning of the tarpaulin 80.

Figure 12:
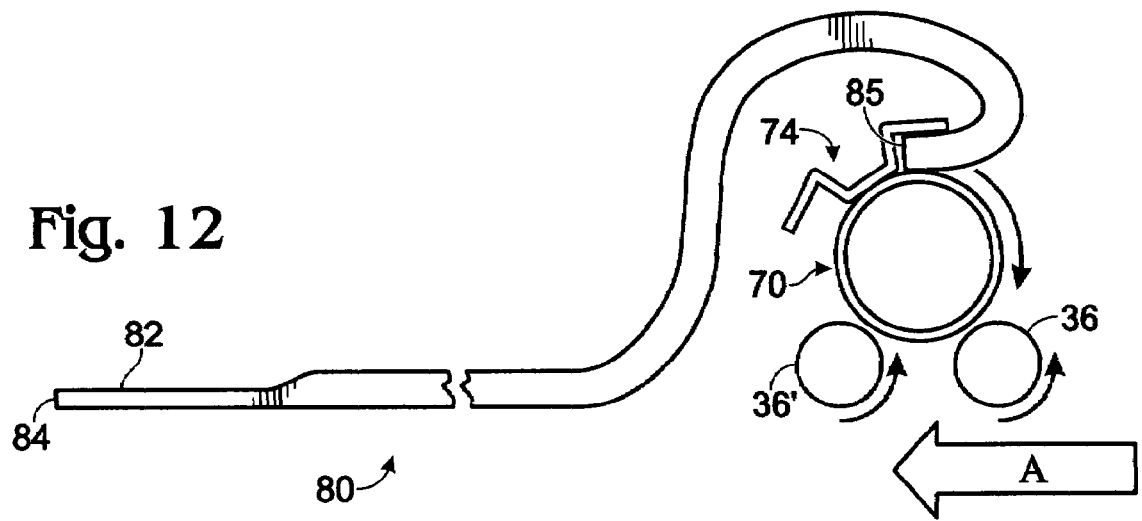
FIG. 12 is a side view of a tarpaulin being releasably fastened to the mandrel of the device preparatory to being rolled up onto the mandrel.

In the illustration of winding up tarpaulin 80 shown in FIG. 12, the forklift would be moving in a forward or reverse direction in the direction indicated by arrow A. The mandrel 70 is positioned over the end 85 of tarpaulin 80 opposite to end flap 82, and the end 85 stuffed into the recesses 78 of pocket members 74. The forklift is then moved in the direction shown by arrow A in FIG. 10. Inner wheels 36 and 36' rotate in the direction shown by the arrows adjacent thereto, which causes mandrel 70 to rotate in the direction shown by the arrow adjacent thereto. The tarpaulin 80 is wound up onto mandrel 70 until the juncture of the main body portion of the tarpaulin and its end flap 82 is reached. The positioning device 10 is then elevated by the forklift to a height sufficient to prevent end flap 82 from dragging on the ground. The positioning device 10 is then moved by the forklift to the end of the load to be tarped. The positioning device 10 is then raised about one foot above the load and the end flap 82 attached to the load or truck/trailer in a manner known in the art. The positioning device 10 is then moved along the load to unwind tarpaulin 80 over the top of the load. The side flaps 86, 86' will typically fall down around the side of the load, or, if not, can be manually lowered. The side flaps 86, 86' are then fastened to the load or truck/trailer in a manner known in the art. If necessary, a pole can be used to move the end flap 82 or side flaps 86, 86' to their desired location.

The use of the descriptors "right", "left", "front", "rear", "inner" and "outer" have been used merely in order to differentiate various elements, and are not to be construed as absolute directions.

It will be obvious to those having skill in the art that many changes may be made to the details of the above-described embodiments of this invention without departing from the underlying principles thereof. The scope of the present invention should, therefore, be determined only by the following claims.

The invention claimed is:
1. A protective sheet placement device comprising:
a chassis having a right side, a left side, a front and a rear;
right and left fork lift tubes attached to said chassis and adapted to receive forks of a forklift;

at least two right wheels and at least two left wheels rotatably attached to said right and left sides of said chassis, respectively, said right and left wheels adapted to allow said chassis to traverse along a horizontal path of motion;

a mandrel support beam having a longitudinal axis and an inner and outer end, said mandrel support beam being attached to said chassis adjacent the inner end of said mandrel support beam, said outer end of said mandrel support beam extending beyond said chassis, said longitudinal axis of said mandrel support beam being substantially perpendicular to said horizontal path of motion of said chassis;

a mandrel having a longitudinal axis and an inner and outer end, said inner end of said mandrel being rotatably attached to said chassis, said outer end of said mandrel being rotatably supported by said mandrel support beam, said longitudinal axis of said mandrel being substantially parallel to said longitudinal axis of said mandrel support beam;

at least one of said left wheels of said chassis being in contact with said mandrel adjacent said inner end of said mandrel in a manner adapted to cause said mandrel to rotate upon rotation of said left wheels.

2. The protective sheet placement device of claim 1 wherein said chassis includes right and left end frame members, each of said right and left end frame members having a front end and a rear end, and cross members extending between said right and left end frame members and attached thereto.

3. The protective sheet placement device of claim 2 wherein said right wheels are rotatably attached to said right end frame member and said left wheels are rotatably attached to said left end frame member.

4. The protective sheet placement device of claim 3 wherein there are first and second right wheels, said first right wheel being rotatably attached to said right end frame member adjacent its front end, and said second right wheel being rotatably attached to said right end frame member adjacent its rear end.

5. The protective sheet placement device of claim 3 wherein there are first and second left wheels, said first left wheel being rotatably attached to said left end frame member adjacent a front mid-portion thereof, and said second left wheel being rotatably attached to said left end frame member adjacent a rear mid-portion thereof.

6. The protective sheet placement device of claim 5 wherein said first and second left wheels are spaced apart a distance adapted to allow said mandrel to rotatably contact upper portions of both of said first and second left wheels.

7. The protective sheet placement device of claim 1 wherein a counterbalancing weight mass is positioned on the right side of said chassis, said counterbalancing weight mass adapted to prevent said protective sheet placement device from tipping over.

8. The protective sheet placement device of claim 1 wherein said chassis includes a plurality of stanchions attached thereto and adapted to receive, and hold said mandrel support beam.

9. The protective sheet placement device of claim 8 wherein each of said stanchions includes a vertical column and front and rear angled struts, said column and said struts having lower ends that are attached to cross members.

10. The protective sheet placement device of claim 9 wherein each of said stanchions has a top, and a cross-beam is attached to the tops of said stanchions.

11. The protective sheet placement device of claim 10 wherein said cross-beam has a clamping member attached thereto at each of locations of said stanchions, said clamping members adapted to receive and hold the inner end of said mandrel support beam.

12. The protective sheet placement device of claim 1 wherein said mandrel has a plurality of aligned pocket members attached thereto along a length thereof, said pocket members being adapted to receive and releasably hold an outer end of a tarpaulin.

\* \* \* \* \*